United States Patent [19]

Ohba

[11] Patent Number: 4,856,751
[45] Date of Patent: Aug. 15, 1989

[54] MOUNT STRUCTURE FOR DIFFERENTIAL GEARBOX

[75] Inventor: Naohiko Ohba, Tochigi, Japan

[73] Assignee: Honda Giken Kogyo Kabushiki Kaisha, Tokyo, Japan

[21] Appl. No.: 195,254

[22] Filed: May 18, 1988

[30] Foreign Application Priority Data

May 20, 1987 [JP] Japan .............................. 62-75735[U]

[51] Int. Cl.⁴ ..................................................... F16M 3/00
[52] U.S. Cl. ................................... 248/638; 180/291; 267/141; 74/710
[58] Field of Search ............... 248/638, 635, 610, 613, 248/573; 267/141.1, 141.2; 188/371; 74/710; 180/291; 280/784

[56] References Cited

U.S. PATENT DOCUMENTS

| | | | |
|---|---|---|---|
| 1,834,879 | 12/1931 | Trott | 180/291 |
| 1,882,349 | 9/1931 | Jansson et al. | 248/635 |
| 2,147,660 | 2/1939 | Loewus | 248/635 X |
| 3,942,599 | 3/1976 | Shimada | 248/610 X |
| 4,391,436 | 7/1983 | Fishbaugh | 267/141.1 |
| 4,711,423 | 12/1987 | Popper | 248/638 X |
| 4,718,296 | 1/1988 | Hyodo | 188/371 X |

Primary Examiner—Ramon O. Ramirez
Attorney, Agent, or Firm—James E. Cockfield

[57] ABSTRACT

A mount structure supports on a vehicle frame assembly a differential gearbox disposed behind a vehicle component such as a fuel tank which requires protection against shocks. The mount structure comprises a first coupling assembly supporting the differential gearbox on a first frame member of the vehicle frame assembly above the differential gearbox, and a second coupling assembly extending between a second frame member of the vehicle frame assembly behind the differential gearbox and the differential gearbox, and supporting the differential gearbox on the second frame member, the second coupling assembly being collapsible under shocks applied longitudinally of the vehicle frame assembly.

9 Claims, 2 Drawing Sheets

MOUNT STRUCTURE FOR DIFFERENTIAL GEARBOX

BACKGROUND OF THE INVENTION

1. Field of the Invention

The present invention relates to a mount structure mounting a differential gearbox on a motor vehicle frame assembly, and more particularly to a mount structure which mounts on a motor vehicle frame assembly a differential gearbox positioned in front of a rear cross beam of the vehicle frame and behind a vehicle component such as a fuel tank which requires protection against shocks.

2. Description of the Relevant Art

Where a differential gearbox is to be installed in front of a rear cross beam extending between rear portions of laterally spaced side frame members of a motor vehicle frame, it is a preferable layout for better space utility to suspend the differential gearbox from a cross member disposed in front of the rear cross beam and extending between the side frame members, and to position a bracket between the differential gearbox and the rear cross beam.

When an object hits the rear end of the vehicle frame to deform the rear cross beam forwardly, the differential gearbox also tends to be displaced forwardly by the bracket. If a vehicle component such as a fuel tank which needs to be protected against shocks are located in front of the differential gearbox, then the differential gearbox is liable to hit the fuel tank. This problem could be avoided by spacing the fuel tank apart from the differential gearbox. This proposal would not be preferable because of a limited space available in the motor vehicle.

SUMMARY OF THE INVENTION

It is an object of the present invention to provide a mount structure by which a differential gearbox is mounted on a motor vehicle frame assembly, the mount structure including bracket means coupled between the differential gearbox and a rear cross beam and collapsible or deformable to absorb shocks applied when the rear cross beam is deformed and displaced forwardly upon a collision or the like for thereby preventing the differential gearbox from moving forwardly into a vehicle component such as a fuel tank which is disposed in front of and near the differential gearbox and requires protection against shocks.

According to the present invention, there is provided a mount structure supporting on a vehicle frame assembly a differential gearbox disposed behind a vehicle component which requires protection against shocks, the mount structure comprising first coupling means supporting the differential gearbox on a first frame member of the vehicle frame assembly above the differential gearbox, and second coupling means extending between a second frame member of the vehicle frame assembly behind the differential gearbox and the differential gearbox, and supporting the differential gearbox on the second frame member, the second coupling means being collapsible under shocks applied longitudinally of the vehicle frame assembly.

The above and further objects, details and advantages of the present invention will become apparent from the following detailed description of a preferred embodiment thereof, when read in conjunction with the accompanying drawings.

DETAILED DESCRIPTION OF THE PREFERRED EMBODIMENT

Figure 1:
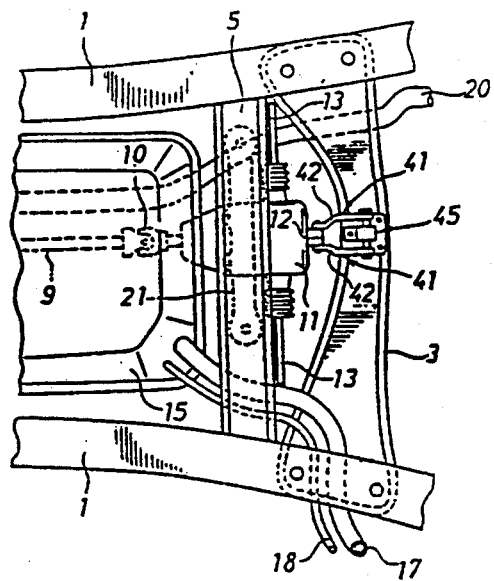
FIG. 1 is a fragmentary plan view of a motor vehicle frame assembly incorporating a mount structure by which a differential gearbox is mounted according to the present invention.
Figure 2:
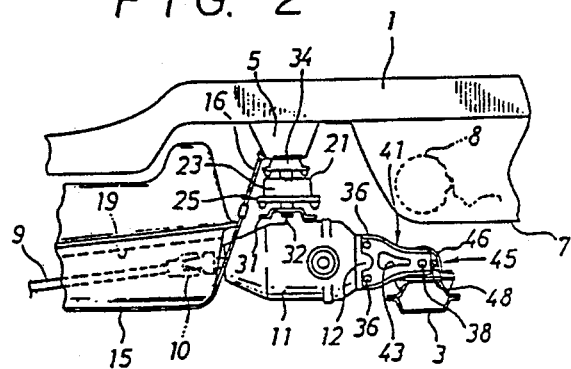
FIG. 2 is a fragmentary side elevational view of the motor vehicle frame assembly shown in FIG. 1.
Figure 3:
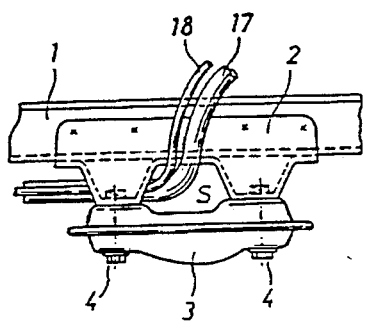
FIG. 3 is a fragmentary side elevational view showing the joint between a side frame member and a rear cross beam in the motor vehicle frame assembly incorporating the mount structure of the invention.

As shown in FIGS. 1 and 2, a motor vehicle has a motor vehicle frame assembly including a pair of laterally spaced side frame members 1, a rear cross beam, and a cross member 5. The motor vehicle also includes a wheel pan 7, a propeller shaft 9, a differential gearbox 11, a pair of drive shafts 13, and a fuel tank 15. The rear cross beam 3 is coupled to and extends between rear portions of the side frame members 1 to which a vehicle floor (not shown) is welded. The differential gearbox 11 and the fuel tank 15 are successively positioned forwardly of the rear cross beam 3. The wheel pan 7 which stores a spare tire 8 is disposed above the rear cross beam 3, which has its opposite ends raised and fastened by front and rear bolts 4 (FIG. 3) to the lower surface of gussets 2 welded to and depending from the side frame members 1, respectively. Between the side frame members 1 in front of the rear cross beam 3, there extends the cross member 5 that is welded to the vehicle floor and to which the rear ends of laterally spaced tank bands 16 supporting the fuel tank 15 are joined. The tank bands 16 have their front ends coupled to a cross member (not shown) similar to the cross member 5.

A filler pipe 17 and a breather pipe 18 which are connected to one side of the rear end of an upper portion of the fuel tank 15 pass outwardly and upwardly through a recess S defined between the rear cross beam 3 and the gusset 2 fixed to one of the side frame members 1 and are connected to a fuel inlet (not shown) on the same side panel of the vehicle body as the filler pipe 17 and the breather pipe 18 exist. The propeller shaft 9 extends through a tunnel 19 disposed longitudinally on the lower surface of the fuel tank 15 and has its rear end coupled to the differential gearbox 11 through a universal joint 10. An exhaust pipe 20 may also extend through the tunnel 19.

Figure 4:
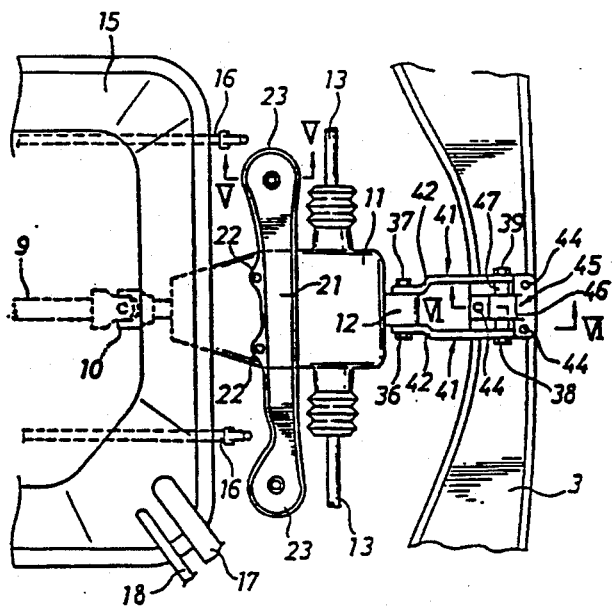
FIG. 4 is an enlarged fragmentary plan view of the motor vehicle frame assembly illustrated in FIG. 1.
Figure 5:
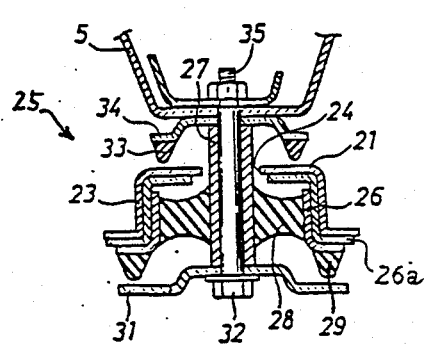
FIG. 5 is a cross-sectional view taken along line V—V of FIG. 4.
Figure 6:
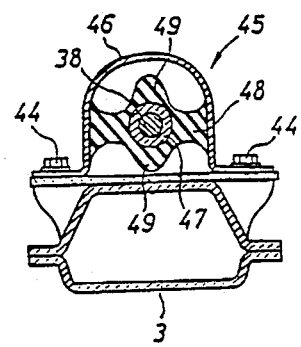
FIG. 6 is a cross-sectional view taken along line VI—VI of FIG. 4.

As shown in FIGS. 4 through 6, the differential gearbox 11 disposed in a space in front of the rear cross beam 3 and behind the fuel tank 15 is coupled to and supported on the vehicle frame assembly at upper and rear sides of the differential gearbox 11 by a mount structure according to the present invention.

More specifically, a laterally extending attachment plate 21 is fastened to the upper surface of the differential gearbox 11 by means of laterally spaced bolts 22. The attachment plate 21 has hat-shaped cases 23 at its opposite ends or a plurality of locations, each of the hat-shaped cases 23 opening downwardly and having a small circular hole 24 defined in its upper wall, as shown in FIG. 5. In each of the hat-shaped cases 23, there is fitted an outer pipe 26 with a stiffening intermediate pipe 26a interposed between the outer pipe 26 and the hat-shaped case 23. The stiffening intermediate pipe 26a is of a substantially shape identical to that of the outer pipe 26. The outer pipe 26 has a lower flange to which a stopper 29 of rubber is bonded upon vulcanization. The hat-shaped case 23, the stiffening intermediate pipe 26a, and the outer pipe 26 jointly constitute a substantially cylindrical assembly in which an inner collar 27 is vertically disposed in coaxial relation to the cylindrical assembly. The inner collar 27 has an upper portion projecting upwardly through the small circular hole 24 with a circular gap around the inner collar 27. The outer peripheral surface of the inner collar 27 and the inner peripheral surface of the outer pipe 26 are joined to each other by an elastomeric body 28 of rubber which is bonded to these surfaces upon vulcanization.

The inner collar 27 is fastened to the lower surface of the cross member 5 by a bolt 32 and a nut 35. More specifically, a stopper member 31 engageable with the stopper 29 is held against the lower end of the inner collar 27, and then the bolt 32 is inserted upwardly through the stopper member 31 and the inner collar 27. Another stopper member 34 which has on its lower surface a stopper 33 of rubber engageable with the upper surface of the hat-shaped case 23 is held against the upper end of the inner collar 27, and then the upper portion of the bolt 32 is inserted upwardly through the stopper member 34 and a hole defined in the cross member 5. Finally, the nut 35 is threaded over the upper end of the bolt 32 against the upper surface of the cross member 5.

The inner collar 27, the stopper members 31, 34, the bolt 32, and the nut 35 jointly constitute a support shaft assembly depending from the lower surface of the cross member 5. The cylindrical assembly, referred to above, which is coupled to the differential gearbox 11 through the attachment plate 21 is swingably suspended from and supported on the support shaft assembly through the elastomeric body 28. The support shaft assembly and the cylindrical assembly with the elastomeric body 28 interposed therebetween jointly serve as a single elastomeric bushing means 25. The stopper 29 of the cylindrical assembly and the stopper member 31 of the support shaft assembly, or the upper surface of the hat-shaped case 23 of the cylindrical assembly and the stopper 33 on the lower surface of the stopper member 34 of the support shaft assembly, are engageable with each other for preventing the cylindrical assembly from excessively swinging.

To achieve the aforesaid arrangement, a general rubber bushing which comprises the outer pipe 26, the inner collar 27, and the elastomeric body 28 interposed between the outer pipe 26 and the inner collar 27 may be fitted in the hat-shaped case 23.

An attachment member 12 integrally projects rearwardly from the rear surface of the differential gearbox 11. A pair of laterally spaced plate members or plate brackets 41 lying vertically has its front end coupled to the opposite sides of the attachment member 12 by means of upper and lower bolts 36 (FIG. 2) and nuts threaded thereon. The plate members 41 have front bent portions 42 bent inwardly toward each other so that the distance between the plate members 41 are smaller at their front ends. The plate members 41 have openings or windows 43 (FIG. 2) defined respectively therein. The bent portions 42 and the windows 43 allow the plate members 41 to collapse or be deformed outwardly away from each other when subjected to shocked applied longitudinally of the plate members 41.

the rear cross beam 3 of the vehicle frame assembly has its central portion disposed underneath the rear ends of the plate brackets 41, which are swingably supported on the central portion of the rear cross beam 3 by an elastomeric bushing means 45. More specifically, as shown in FIG. 6, the elastomeric bushing means 45 comprises a laterally extending outer case 46 which is of an inverted U shape as viewed in side elevation or of a substantially cylindrical shape, the outer case 46 having front and rear flanges, and an inner collar 47 coaxially disposed in the outer case 46 with an elastomeric body 48 of rubber interposed therebetween. The inner collar 47 is of an elongate configuration with its opposite ends projecting outwardly from the lateral openings of the outer case 46. The elastomeric body 48 is bonded to inner and outer surfaces of the outer case 46 and the inner collar 47 such that the elastomeric body 48 extends longitudinally of the vehicle frame assembly between the outer case 46 and the inner collar 47. Stoppers 49 of rubber project upwardly and downwardly from the inner collar 47 integrally with or separately from the elastomeric body 48 for abutting engagement with the inner peripheral surface of the outer case 46 or the upper inner peripheral surface of the outer case 46 and the upper surface of the rear cross beam 3. The outer case 46 is fastened to the upper surface of the rear cross beam 3 by means of bolts 44, one extending through the front flange of the outer case 46 and two extending through the rear flange thereof.

The rear ends of the plate members 41 are held against the opposite ends of the inner collar 47 of the elastomeric bushing means 45 on the rear cross beam 3 and are fastened thereto by means of a bolt 38 and a nut 39.

As described above, the rear ends of the plate members 41 are coupled respectively to the opposite ends of the inner collar 47 and the bolt 38 which jointly serve as a support shaft assembly of the elastomeric bushing means 45 fixedly mounted on the rear cross beam 3. Therefore, the differential gearbox 11 is vertically swingably supported on the vehicle frame assembly at a position behind the differential gearbox 11.

In the present embodiment, the differential gearbox 11 is floatingly mounted on the vehicle frame assembly by the elastomeric bushing means 25 interposed between the differential gearbox 11 and the upper cross member 5 and the elastomeric bushing means 45 interposed between the differential gearbox 11 and the rear cross beam 3. The plate brackets or plate members 41 are vertically swingable about the bolt 38 by which the plate brackets 41 are pivotally coupled to the elastomeric bushing means 45. Therefore, vibration of the differential gearbox 11 produced while the vehicle is running is absorbed by elastic deformation of the upper and rear elastomeric bushing means 25, 45 and vertical swinging movement of the plate brackets 41.

When the central portion of the rear cross beam 3 is deformed and displaced forwardly upon a collision or the like, the elastomeric bushing means 45, i.e., the elastomeric body 48 of rubber, on the rear cross beam 3 is compressed to its limit, whereupon the shock is transmitted through the plate members 41 to the differential gearbox 11, causing the elastomeric bushing means 25 to be compressed to its limit. Swining movement of the differential gearbox 11 at this time is prevented by the stopper members 31, 34.

Figure 7:
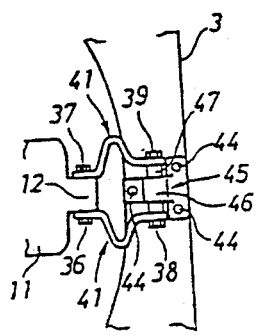
FIG. 7 is a plan view showing the manner in which plate brackets employed in the mount structure of the invention collapse.

The plate members 41 extending between the differential gearbox 11 and the rear cross beam 3 are collapsible under shocks applied longitudinally of the plate members 41. Therefore, as shown in FIG. 7, the plate members 41 are collapsed or deformed outwardly away from each other thereby to absorb the applied shocks. The differential gearbox 11 is thus prevented from being displaced forwardly. Consequently, the differential gearbox 11 is prevented from hitting or being thrust into the fuel tank 15 that is positioned near the front end of the differential gearbox 11.

Since the filler pipe 17 and the breather pipe 18 connected to the fuel tank 15 pass through the recess S defined between the gusset 2 and the rear cross beam 3 which are relatively high in rigidity, these pipes 17, 18 are not required to be largely bent so as to avoid nearby components in front of the cross beam 3 or are not required to be largely bent behind the cross beam 3. Thus, the pipes 17, 18 are not unduly bent in front of or behind the cross beam 3 upwardly toward the upper fuel inlet. As a consequence, the filler pipe 17 presents small resistance to the flow of fuel therethrough. The filler pipe 17 and the breather pipe 18 which are inserted through the recess S defined by the rigid members are also well kept in position and protected against damage.

With the present invention, as described above, the collapsible plate brackets 41 which are laterally spaced from each other and lie vertically extend between the rear cross beam 3 and the differential gearbox 11 which is suspended from and supported on the cross member 5 between the side frame members 1. When the rear cross beam 3 is displaced in the forward direction upon a collision or the like, the applied shocks can be absorbed by collapsing of the plate brackets 41 behind the differential gearbox 11. The differential gearbox 11 is therefore prevented from being displaced forwardly and hence thrust into a vehicle component such as the fuel tank 15 which is disposed in front of and near the differential gearbox 11 and needs to be protected against shocks.

In the illustrated mount structure for the differential gearbox 11, the differential gearbox 11 is coupled to and supported on the vehicle frame assembly at upper and rear locations on the differential gearbox 11. However, the differential gearbox 11 may be coupled to and supported on the vehicle frame assembly at other locations or three or more locations. In the illustrated embodiment, the plate brackets are used as part of the coupling means by which the differential gearbox 11 is supported at its rear portion on the vehicle frame assembly. However, other collapsible bracket means long enough to abosorb, when collapsed, the forward displacement of the rear cross beam 3 caused by application of shocks from behind may also be employed as it can avoid a direct collision between the rear cross beam 3 and the differential gearbox 11.

Although there has been described what is at present considered to be the preferred embodiment of the present invention, it will be understood that the invention may be embodied in other specific forms without departing from the spirit or essential characteristics thereof. The present embodiment is therefore to be considered in all aspects as illustrative, and not restrictive. The scope of the invention is indicated by the appended claims rather than by the foregoing description.

I claim:

1. A mount structure supporting on a vehicle frame assembly a differential gearbox disposed behind a fuel tank, said mount structure, comprising:
   first coupling means supporting said differential gearbox on a first frame member of said vehicle frame assembly above said differential gearbox; and
   second coupling means extending between a second frame member of said vehicle frame assembly behind said differential gearbox and said differential gearbox, and supporting said differential gearbox on said second frame member, said second coupling means having a selected stiffness in a vertical direction and being collapsible under shocks applied longitudinally of said vehicle frame assembly.

2. A mount structure according to claim 1, wherein said second coupling means comprises
   an elastomeric bushing member mounted on said second frame member and
   collapsible bracket means having
      a rear end elastically coupled to said elastomeric bushing member so as to be vertically swingable and
      a front end fixed to a rear portion of said differential gearbox.

3. A mount structure according to claim 2, wherein said bracket means comprises a pair of laterally spaced plate brackets having front end portions bent inwardly toward each other with a reduced spacing therebetween, said plate brackets having windows defined respectively therein.

4. A mount structure according to claim 2, wherein said second frame member comprises a rear cross beam disposed in a rear portion of said vehicle frame assembly and extending transversely of said vehicle frame assembly, said elastomeric bushing member being mounted on said rear cross beam.

5. A mount structure according to claim 4, wherein said elastomeric bushing member comprises a cylindrical case extending along said rear cross beam and fixed to the rear cross beam, a support shaft assembly extending coaxially in said cylindrical case, and an elastomeric body interposed between said cylindrical case and said support shaft assembly at least longitudinally of said vehicle frame assembly and joining said cylindrical case and said support shaft assembly, said bracket means having a rear end coupled to said support shaft assembly.

6. A mount structure according to claim 5, wherein said second support shaft assembly has a vertically extending stopper member engageable with an inner peripheral surface of said cylindrical case for limiting a range of swinging movement of said bracket means.

7. A mount structure supporting on a vehicle frame assembly a differential gearbox disposed behind a vehicle component which requires protection against shocks, said mount structure comprising:
   first coupling means supporting said differential gearbox on a first frame member of said vehicle frame assembly above said differential gearbox; and second coupling means extending between a second frame member of said vehicle frame assembly behind said differential gearbox and said differential gearbox, and supporting said differential gearbox on said second frame member, said second coupling means being collapsible under shocks applied longitudinally of said vehicle frame assembly wherein said first coupling means comprises an attachment plate fixed to an upper surface of said differential gearbox, and at least one first elastomeric bushing member depending from said first frame member and supporting said differential gearbox on said first frame member through said attachment plate.

8. A mount structure according to claim 7, wherein said first elastomeric bushing member comprises a first support shaft assembly depending downwardly and having an upper end fixed to said first frame member, and a first cylindrical member disposed coaxilly with said first support shaft assembly with a first elastomeric body interposed therebetween, said first cylindrical member being coupled to said attachment plate, said differential gearbox being suspended from and supported on said first frame member through said first elastomeric body so as to be swingable within a prescribed range.

9. A mount structure according to claim 8, wherein said first support shaft assembly of the first elastomeric bushing member has a stopper disposed in a range of swinging movement of said first cylindrical member to limit swinging movement of the first cylindrical member.

* * * * *